United States Patent Office 3,022,221
Patented Feb. 20, 1962

3,022,221
IRON HYDROGENATED DEXTRAN
Nicholas A. Fiorame, Easton, Pa., assignor to Chemicals Incorporated, Luquillo, Puerto Rico, a corporation of Puerto Rico
No Drawing. Filed Apr. 16, 1959, Ser. No. 806,791
9 Claims. (Cl. 167—68)

This invention relates to iron hydrogenated dextran, and more particularly to a composition useful in parenteral injection purposes in the treatment of iron-deficiency anemia.

A wide variety of preparations have been utilized in the form of parenteral injections in the treatment of iron-deficiency anemia. In particular, such preparations include the so-called saccharated oxide of iron preparations, and more recently colloidal ferric hydroxide-dextran complex.

The saccharated oxide of iron preparations produce considerable pain and inflammation at the site of the injection, even when sub-therapeutic doses are administered. Furthermore, such preparations are not readily absorbed when injected intramuscularly.

It is for these reasons that colloidal ferric hydroxide dextran complexes have achieved a substantial degree of success in recent years, and to a considerable extent have replaced the saccharated oxide of iron preparations. However, extensive experience with colloidal ferric hydroxide-dextran complexes has revealed that the same have a tendency to cause side reactions after injection.

Furthermore, experience with the manufacture of ferric hydroxide-dextran complex has indicated that the same is difficult to sterilize because of pronounced variations in the final product after autoclaving. Such pronounced variations include changes in pH, variations in color, and variations in clinical effect.

This invention has as an object the provision of a novel therapeutic composition, and of a method of preparing the same.

This invention has another object the provision of a colloidal ferric hydroxide-hydrogenated dextran complex which has a far lower tendency to produce undesirable clinical side reactions than ferric hydroxide-dextran complex, and yet which possesses all of the clinical efficacy for the treatment of iron-deficiency anemia of ferric hydroxide-dextran complex.

This invention has as a still further object the provision of a therapeutic composition which may be more readily sterilized than ferric hydroxide-dextran complex and is far less prone to undergo changes on autoclaving.

Other objects will appear hereinafter.

The partially-depolymerised dextran which I use as a starting-material is derived from raw dextran obtained according to known methods by growing under carefully-controlled conditions of temperature, appropriate organisms, especially *Leuconostoc mesenteroides*, syn. *Betacoccus arabinosaceous* in a suitable nutrient medium containing a high proportion of sucrose. It is further known that the highly polymerised raw dextran gives rise on partial degradation as, for example, by treatment with dilute mineral acid, to simpler polymeric forms from aqueous solutions of which (being polydisperse), fractions of different average molecular weight can be precipitated by adding a suitable water-miscible organic liquid, such as methyl alcohol, ethyl alcohol or acetone. These degradation products consist of polymerised glucose residues, joined predominantly by $\alpha$-1:6 and, to a lesser extent, by $\alpha$-1:4 linkages.

A fraction of this kind is suitable as a starting-material for the purpose of my invention, but the molecular range of the partially depolymerized dextran is selected from the standpoint of the physical characteristics such as intrinsic viscosity, of the solution containing the minimum concentration of the dextran needed to ensure continued stability of the parenteral iron solution, rather than from the customary one of the physiological effects of the dextran itself, which are here of secondary importance.

In the present context the intended meaning of intrinsic viscosity is the limiting value of specific viscosity divided by concentration at infinite dilution measured by the following method. The "flow time" of at least three solutions of different concentrations (all less than 5% w./v. dextran) is determined in an Ostwald viscometer. The flow time of the solution divided by the flow time for water at the same temperature, gives the relative viscosity of the composition of the invention at the given concentration. The specific viscosity of the composition of the invention at a given concentration is obtained by subtracting 1.0 from the value for relative viscosity. For each concentration of the composition of the invention, the factor (specific viscosity divided by concentration) is calculated and this factor is plotted against the percentage concentration of the solution from which it was obtained. By extrapolating the graph obtained to zero concentration, the limiting value of the factor (specific viscosity divided by concentration) is obtained. This value is known as the intrinsic viscosity of the material in the solution. Due to the fact that the fractions of dextran described are polydisperse, the term average intrinsic visvosity is used.

To avoid any possible misinterpretation, the term "average intrinsic viscosity" refers to the hydrogenated dextran itself and not to an aqueous solution of it, or an aqueous solution of its ferric hydroxide complex.

I have found that stable iron solutions can be prepared from fractions of hydrogenated dextran of intrinsic viscosity ranging from 0.03 to 0.15, and optimally 0.03 to 0.08. The iron content of the therapeutic solution of my invention should be within the range of three weight percent to seven weight percent of elemental iron (corresponding to about six weight percent to fourteen weight percent of ferric hydroxide). The extent of degradation of the hydrogenated dextran should be such that it should have an average intrinsic viscosity of 0.03 to 0.15, and preferably between 0.03 to 0.08. A method for preparing such hydrogenated dextran is set forth below as it is believed that the hydrogenated dextrans used in the subject invention are new materials, not heretofore known.

The pH of the finished therapeutic composition of my invention should be between 5.5 to 7.0. The extent of hydrogenated dextran in the finished product should be below about twenty-five weight percent, and preferably between about ten to twenty weight percent.

In the finished therapeutic composition of the present invention there is present colloidal ferric hydroxide. The colloidal ferric hydroxide may be formed in the presence of the partially depolymerized hydrogenated dextran by heating a suitable water-soluble ferric salt and the hydrogenated dextran together in aqueous solution with an excess of alkali, the same comprising a double decomposition reaction.

Suitable ferric compounds comprise: (1) water soluble ferric salts, such as the chloride, nitrate, sulphate or acetate, and double salts such as ferric ammonium sulphate, or their obvious chemical equivalents; (2) ferric oxy-salts prepared by dissolving ferric hydroxide in a solution of a ferric salt; dialyzed iron solution P.B.C. and freshly-precipitated washed ferric hydroxide; (3) any ferric compound which, when rendered alkaline in the presence of hydrogenated dextran, gives rise to ferric hydroxide.

The alkali of choice for the purpose of this invention is sodium hydroxide, but other suitable alkalis comprise the hydroxides of lithium, potassium and ammonium; the carbonates of lithium, sodium and potassium and their obvious chemical equivalents.

Stable preparations appropriate for intramuscular injection can also be obtained according to my invention from ferric citrate, ferric ammonium citrate and ferric glycerophosphate, but in these instances I have shown it to be desirable definitely to use a caustic alkali, for example, sodium hydroxide, as the agent for rendering the mixture alkaline during the preparation thereof.

I have further found that my novel colloidal injectable iron preparations can be purified from the electrolytes which are formed simultaneously as by-products by utilizing either of the following techniques:

(a) Subjecting a preparation according to the invention to dialysis against running water until the desired osmotic pressure has been obtained;

(b) Mixing a preparation according to the invention with a suitable water-miscible solvent such as methyl alcohol, ethyl alcohol or acetone in quantity sufficient to separate the colloid, separating the latter from solution and re-dissolving it in distilled water to the required concentration.

It sometimes happens that a parenteral iron preparation obtained by the improved process is slightly hypotonic; thus the freezing-point depression of a colloidal solution containing about five percent elemental iron, as normally prepared for intramuscular injection, is frequently less than 0.53° C. (the approximate depression obtained with isotonic saline): in such a case, a suitable amount of an appropriate substance such as sodium chloride or glucose may be added to raise the freezing-point depression value of the preparation to 0.53° C. and thereby render it substantially isotonic with blood.

As above-indicated, the pH of the therapeutic composition of the present invention should fall within the range 5.5 to 7.0. The pH may be adjusted, prior to sterilization, with acid or with alkali, so as to insure that the pH falls within these limits.

Sterilization of the preparations made in accordance with the present invention can be effected by autoclaving such preparations in their final containers, as, for example, ampoules, for thirty minutes at a steam pressure of ten pounds per square inch corresponding to a temperature of 115° C. Unlike colloidal ferric hydroxide-dextran complex preparations, the therapeutic compositions of the present invention are relatively highly resistant to changes in pH, and to the changes in color and/or clarity as a result of autoclaving.

When colloidal solutions prepared in accordance with my invention are dehydrated as, for example, by evaporation under reduced pressure or, alternatively, by the separation and subsequent desiccation of the product obtained on precipitating the colloid by adding a suitable water-miscible solvent such as methyl alcohol, ethyl alcohol or acetone, there can be obtained solidified preparations suitable for the immediate reconstitution of colloidal injectable iron solutions by the addition of distilled water.

The therapeutic compositions of the present invention satisfy the following requirements which have been established as being desirable for an iron solution intended for intramuscular injection in the treatment of iron-deficiency anemia:

(a) No effect on the pH of the body fluids;
(b) Isotonicity with the tissue fluid;
(c) Stability in presence of protein and electrolytes;
(d) Ready availability for haemoglobin synthesis;
(e) Rapid absorption coupled with a low rate of excretion;
(f) Maximal iron content in minimal volume;
(g) Low toxicity;
(h) Reproducibility;
(i) Stability on storage.

The hydrogenated dextran used in the therapeutically useful compositions of the present invention has an average intrinsic viscosity of 0.03 to 0.15 and preferably between 0.03 to 0.08. This is below the average intrinsic viscosity of the hydrogenated dextrans which have been reported in the literature, as for example in United States Letters Patent 2,807,610, issued September 24, 1957, in the name of Morris Zief and Joseph R. Stevens. Thus, the hydrogenated dextrans utilized in the subject invention are derived from dextrans having an appreciably lower average intrinsic viscosity than those disclosed in the examples of United States Letters Patent 2,807,610. Thus, while it has heretofore been proposed in United States Letters Patent 2,807,610 to hydrogenate dextrans having average molecular weights of 75,000, or average molecular weights between 50,000 to 100,000, the optimum range of dextrans used to form the hydrogenated dextrans to be used in the therapeutically useful compositions of the present invention lie in the molecular weight range of 2,000 to about 10,000, namely an average intrinsic viscosity of 0.03 to 0.08. However, notwithstanding the relatively high extent of depolymerization of the dextrans used to form the hydrogenated dextrans of the subject invention, I have determined that the procedure set forth in Example III of Patent 2,807,610 can be successfully followed with low molecular weight dextrans of the aforesaid molecular weight range to produce the hydrogenated dextrans having the aforementioned average intrinsic viscosities. The hydrogenated dextrans used in the subject invention are substantially non-reducing to the Somogyi reagent.

As illustrative of a method of preparing hydrogenated dextran useful in the therapeutically useful compositions of the present invention, I submit the following:

*Example A*

200 grams of sodium borohydride dissolved in water were added to a ten percent aqueous solution containing ten pounds of dextran having an average intrinsic viscosity of 0.05. The mixture was allowed to stand at room temperature for five hours with occasional stirring, and then was acidified with thirty percent acetic acid. The acidified mixture was passed through a column of a cation exchange resin, and the effluent therefrom was passed through a column of an anion exchange resin. Methyl alcohol was added with stirring to the so-deionized solution to give a solution containing eighty percent of methyl alcohol by volume. After standing for twenty-four hours at 25° C., the supernatant solution was decanted from the precipitated reduced dextran. The product was dried at 100° C. at atmospheric pressure for one hour, then at 100° C. in vacuum for two hours. The product was non-reducing to the Somogyi reagent. It is desirable that preliminary testing be made when dealing with different batches of dextran to determine that an adequate amount of sodium borohydride is present, in the above example, the sodium borohydride is present in excess of its minimum requirement.

The invention will be illustrated by the following specific examples, but it is not limited thereto. Many different components may be substituted, as above-indicated in the case of the variety of ferric compounds, and alkalis for those set forth in the examples. Furthermore, new sources of ferric compounds, etc. may be developed and made commercially available. It is therefore not only impossible to attempt a comprehensive catalog of useful components, but to attempt to apprehend or describe the invention in its broader aspects in terms of the chemical names of all of the possible components used would be misleading. To formulate a set of specifications for a composition in the light of the present disclosure will call for chemical knowledge and skill, but the office of the chemist will be like that of the mechanical engineer who prescribes in the construction of a machine the proper materials and the proper dimensions therefor. From his knowledge as a chemist of the materials available he will know or deduce with confidence their applicability to the purposes of the invention or, otherwise, and in the case of novel materials, routine tests not of an inventive nature will provide reliable data. I may safely assume that no one will wish to make a useless composition or will be misled because it is possible to misapply the teachings of the present disclosure in order to do so.

*Example I*

1.2 parts by weight of ferric chloride (based on dry hydrogenated dextran) is added to a twelve weight percent solution of hydrogenated dextran having an average intrinsic viscosity at 25° C. of approximately 0.05. When the ferric chloride is in solution, 5 normal sodium hydroxide is added slowly with vigorous agitation until the solution has a pH of 11.0. The solution is then heated to 95° C. for thirty minutes, cooled to room temperature, and filtered. The resultant ferric hydroxide-hydrogenated dextran complex is then precipitated with isopropyl alcohol (in this connection, any of the large number of known precipitating agents for dextran may be utilized), dedissolved, and the aforesaid precipitation repeated. The pH is then adjusted to 6.5 with 5 normal hydrochloric acid. The ferric hydroxide-hydrogenated dextran complex is precipitated from the acidified solution with isopropyl alcohol.

The ferric hydroxide-hydrogenated dextran precipitate is dissolved in water to give approximately fifteen weight percent of solids, and the alcohol is boiled off. The iron concentration is then adjusted to give an iron concentration of five weight percent, the pH of the solution is adjusted to 6.9, the solution is filtered, and then the colloidal solution is sterilized by autoclaving.

*Example II*

The procedure set forth in Example I was followed, except that in place of the ferric chloride, a stoichiometric amount of ferric citrate was substituted. It was found that at a temperature of about 60° C. the reaction was complete in about two hours while at a temperature of about 80° C. the reaction was complete in about forty-five minutes.

*Example III*

The procedure set forth in this example enables a complex to be obtained which contains a much higher ratio of iron to hydrogenated dextran than is possible with the procedures set forth in Examples I and II which were entirely performed at atmospheric pressures. Furthermore, the procedure of this example enables a hydrogenated dextran of a higher molecular weight than that utilized in Examples I and II to be utilized for a given weight percentage of iron, and yet yield a stable iron hydroxide-hydrogenated dextran complex.

1.2 parts by weight of ferric chloride based on dry hydrogenated dextran are added to a twelve weight percent solution of a hydrogenated dextran having an average intrinsic viscosity of 0.1. When the ferric chloride is solubilized, the pH of the solution is raised to approximately 2.2 using 5 normal sodium hydroxide. The iron-hydrogenated dextran complex is precipitated from this solution with isopropyl alcohol, redissolved, and then reprecipitated with isopropyl alcohol a second time.

The last-obtained precipitate is dissolved in water to yield a solution of approximately twenty weight percent solids and boiled to remove alcohol. It was then heated under fifteen pounds pressure for thirty minutes at a pH of 2.2. After cooling, the pH of the solution is raised to a pH of 10.5 by the addition of 5 normal sodium hydroxide and then heated under a pressure of fifteen pounds per square inch for thirty minutes. This solution is then cooled and ferric hydroxide-hydrogenated dextran complex precipitated therefrom with isopropyl alcohol.

The ferric hydroxide-hydrogenated dextran precipitate is dissolved in water to form a solution containing approximately twenty weight percent of solids. This solution is then boiled to remove isopropyl alcohol, and the iron concentration adjusted to five weight percent of elemental iron. The pH is then adjusted to 6.5, the solution is filtered, 0.3 weight percent of phenol may be added as a preservative, and the solution is sterilized by autoclaving. If desired, vitamin $B_{12}$ may be added at this point.

The utilization of the procedure of Example III with its superatmospheric heating for thirty minutes enables a complex having a high weight percent of elemental iron to be formed using relatively high molecular weight hydrogenated dextran. In the absence of the utilization of superatmospheric pressures, only relatively low molecular weight hydrogenated dextrans may be utilized to complex iron to the extent of between five weight percent to seven weight percent.

A comparison between the ferric hydroxide-hydrogenated dextran complex of the present invention and the ferric hydroxide-dextran complex described in United States Letters Patent 2,820,740, issued January 21, 1958, in the names of Eric London and George Daniel Twigg revealed that the subject complex is substantially non-reducing to Somogyi reagent whereas that of United States Letters Patent 2,820,740 is reducing to Somogyi reagent.

It is difficult to explan the precise nature of the complex of the present invention on the basis of present-day chemical theory. In ferric hydroxide-dextran complex derived from degraded dextran it can be reliably postulated that the ferric hydroxide is coupled with the carbonyl or carboxyl groups thereof, since it is known that the acid hydrolysis of dextran gives rise to products containing aldehydo, keto, or carboxyl groups. However, the hydrogenated dextran utilized in the ferric hydroxide-hydrogenated dextran complex of the present invention is non-reducing to Somogyi reagent.

It is therefore most difficult to postulate the manner in which the ferric hydroxide-hydrogenated dextran complex is formed, but it would appear to be formed from a different mechanism than ferric hydroxide-dextran complex, although I do not wish to be bound by any theory of formation since present day scientific techniques are incapable of elucidating this matter. Nevertheless, the difficulty with postulating an aldehydo, keto, or carboxyl coupling to the ferric hydroxide is increased when it is realized that by following the procedure of Example III, complexes having a high weight percentage of elemental iron may be secured utilizing relatively high molecular weight hydrogenated dextran, such as hydrogenated dextran having an average intrinsic viscosity of as much as 0.15. Considering the relatively high molecular weight of this material, and the fact that it is hydrogenated, it is difficult to postulate under present day theory how a ferric hydroxide complex may be formed therefrom in which elemental iron is present to the extent of as much as seven weight percent in solution.

The therapeutic compositions of my invention are essentially free from iron ions, and therefore may be classified as nonionic. Shelf testing has revealed such compositions to be very stable on storage, which perhaps can be attributed to the hydrogenation of carbonyl groups present in non-hydrogenated dextran within the average intrinsic viscosity range of the subject invention.

The present invention may be embodied in other specific forms without departing from the spirit or essential attributes thereof, and, accordingly, reference should be made to the appended claims, rather than to the foregoing specification as indicating the scope of the invention.

I claim:

1. A therapeutically useful composition comprising a substantially non-ionic complex which is stable on contact with water of ferric hydroxide and a hydrogenated dextran having an average intrinsic viscosity of about 0.03 to about 0.15 at 25° C., said hydrogenated dextran being substantially non-reducing to the Somogyi reagent.

2. A therapeutically useful composition in accordance with claim 1 in which the hydrogenated dextran has an average intrinsic viscosity at 25° C. of about 0.03 to about 0.08.

3. A therapeutically useful composition in accordance with claim 1 comprising about three to seven weight percent of elemental iron.

4. A therapeutically useful composition in accordance with claim 3 comprising about five weight percent of elemental iron.

5. A therapeutically useful composition in accordance with claim 3 including water and having a pH of between 5.5 to 7.0.

6. A therapeutically useful composition in accordance with claim 5 in which the ferric hydroxide-hydrogenated dextran complex is present as a colloidal solution to the extent of between 10.0 and 20.0 weight percent.

7. The process which comprises parenterally injecting a therapeutic amount of the composition of claim 1 intramuscularly into an animal.

8. The process of preparing a therapeutically useful composition comprising a substantially non-ionic colloidal ferric hydroxide-hydrogenated dextran complex which comprises combining, in contact with water, a hydrogenated dextran having an average intrinsic viscosity at 25° C. of about 0.03 to 0.15, said hydrogenated dextran being substantially non-reducing to the Somogyi reagent, with ferric hydroxide, said ferric hydroxide being formed in situ in contact with the hydrogenated dextran by a double decomposition reaction between an ionizable ferric salt and an alkali base.

9. The process of preparing a substantially non-ionic colloidal ferric hydroxide-hydrogenated dextran complex which comprises the step of forming ferric hydroxide in situ in an aqueous solution under superatmospheric steam pressure at boiling temperature in contact with a hydrogenated dextran having an average intrinsic viscosity of between 0.03 and 0.15 at 25° C., said hydrogenated dextran being substantially non-reducing to the Somogyi reagent.

References Cited in the file of this patent

UNITED STATES PATENTS

| | | |
|---|---|---|
| 2,807,610 | Zief et al. | Sept. 24, 1957 |
| 2,820,740 | London et al. | Jan. 21, 1958 |